United States Patent
Lee et al.

(10) Patent No.: US 9,063,660 B1
(45) Date of Patent: Jun. 23, 2015

(54) STORAGE DEVICE AND DATA TRANSMISSION CONTROL METHOD THEREOF

(71) Applicant: Lite-On Technology Corporation, Taipei (TW)

(72) Inventors: Yi-Chung Lee, Hsinchu (TW); Yi-Jen Chen, Hsinchu (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 14/225,773

(22) Filed: Mar. 26, 2014

(30) Foreign Application Priority Data

Dec. 30, 2013 (CN) .......................... 2013 1 0746726

(51) Int. Cl.
*G06F 3/06* (2006.01)
(52) U.S. Cl.
CPC ............ *G06F 3/0611* (2013.01); *G06F 3/0679* (2013.01); *G06F 3/0658* (2013.01)

(58) Field of Classification Search
CPC ....... G06F 3/061; G06F 13/385; G06F 3/067; G06F 3/0607; G06F 3/0689
See application file for complete search history.

(56) References Cited

U.S. PATENT DOCUMENTS

| | | | | |
|---|---|---|---|---|
| 7,827,320 | B1* | 11/2010 | Stevens | 710/5 |
| 2005/0210318 | A1* | 9/2005 | Marks et al. | 714/7 |
| 2006/0095596 | A1* | 5/2006 | Yung et al. | 710/5 |

* cited by examiner

*Primary Examiner* — Farley Abad
(74) *Attorney, Agent, or Firm* — WPAT, PC; Justin King (57) ABSTRACT

A data transmission control method for a storage device is provided. The storage device is in communication with a host through a SATA bus. The data transmission control method includes the following steps. Firstly, a X_RDY primitive is issued from the storage device to the host. After a R_RDY primitive from the host is received by the from the storage device, a first frame is transmitted to the host. After the first frame is completely transmitted and in a specified time period before a second frame is transmitted, plural SYNC primitives are issued from the storage device to the host. If the host does not issue the X_RDY primitive in the specified time period, the second frame is transmitted to the host.

8 Claims, 6 Drawing Sheets

FIG. 5B

STORAGE DEVICE AND DATA TRANSMISSION CONTROL METHOD THEREOF

This application claims the benefit of People's Republic of China Application Serial No. 201310746726.5, filed Dec. 30, 2013, the subject matter of which is incorporated herein by reference.

FIELD OF THE INVENTION

The present invention relates to a storage device and a control method thereof, and more particularly to a storage device using a SATA bus to connect with a host and a data transmission control method thereof.

BACKGROUND OF THE INVENTION

With increasing development of science and technology, a serial advanced technology attachment (SATA) bus is widely used as a connection bus between a storage device and a host of a computer system in order to replace the conventional integrated device electronics (IDE) bus. The storage device is for example a hard disc drive or a solid state drive.

Generally, the SATA specifications comprise a SATA 1.0 specification, a SATA 2.0 specification and a STAT 3.0 specification. The data transmission speed of the SATA 1.0 specification is 1.5 Gbit/s, the data transmission speed of the SATA 2.0 specification is 3 Gbit/s, and the data transmission speed of the SATA 3.0 specification is 6 Gbit/s. That is, with the increasing progress of the SATA specifications, the speed of transferring data between the host and the storage device is gradually increased. Moreover, the SATA 3.0 specification further supports native command queuing (NCQ) in order to achieve better performance of transferring data between the host and the storage device.

The storage device that supports the NCQ may receive plural commands from the host. Moreover, the commands are not sequentially executed by the storage device in order. On the contrary, the storage device may rearrange the sequence of executing these commands according to the types of the commands and the storage positions of the data.

According to the SATA 3.0 specification, the storage device that supports the NCQ may continuously receive 32 commands from the host and execute these commands in an out-of-order manner.

For example, if 32 read commands from the host are received by the storage device, after the sequence of the read commands are rearranged by the storage device, the read data corresponding to the read commands are transmitted back from the storage device to the host. After the execution of any read command is completed, the host may issue a new read command to the storage device again. Since 32 read commands are ready to be executed by the storage device at any time, the reading performance of the storage device is largely enhanced.

However, the current SATA 3.0 specification still has some drawbacks. For example, after the read data is transmitted back from the storage device, it is difficult for the host to transmit a new read command to the storage device. The reasons will be illustrated as follows.

According to the SATA 3.0 specification, while the host and the storage device intend to exchange data between each other simultaneously, the host has to postpone the frame transmission at first. That is, when the host and the storage device simultaneously issue a frame transmission request, the priority of the frame transmission of the storage device is higher than the priority of the frame transmission of the host. Moreover, the contents of the frame may contain read data, write data or commands.

For example, after the 32 read commands are received by the storage device, the read data corresponding to the read commands are continuously transmitted back from the storage device to the host. During the process of continuously transmitting the 32 read data from the storage device to the host, the frame transmission requests from the host are almost postponed. Consequently, after the 32 read data are completely transmitted from the storage device to the host and no read commands are ready to be executed by the storage device, the frame transmission request can be successfully issued from the host and the new read command can be successfully transmitted to the storage device.

From the above discussions, if there are no read commands to be executed by the storage device at any time, the reading performance of the storage device will be deteriorated. The transmission of the read command is presented herein for purpose of illustration and description only. It is noted that the same situations may be applied to the transmission of the write command and the write data.

For increasing the accessing performance of the storage device according to the SATA specification, it is suitable to continuously provide the read commands to be executed by the storage device.

SUMMARY OF THE INVENTION

An embodiment of the present invention provides a data transmission control method for a storage device. The storage device is in communication with a host through a SATA bus. The data transmission control method includes the following steps. Firstly, a X_RDY primitive is issued from the storage device to the host. After a R_RDY primitive from the host is received by the storage device, a first frame is transmitted to the host. After the first frame is completely transmitted and in a specified time period before a second frame is transmitted, plural SYNC primitives are issued from the storage device to the host. If the host does not issue the X_RDY primitive in the specified time period, the second frame is transmitted to the host.

Another embodiment of the present invention provides a storage device. The storage device is in communication with a host through a SATA bus. The storage device includes a controlling unit, a flash memory, and a cache memory. The controlling unit is used for receiving plural read commands from the host and correspondingly transmitting plural read data to the host. The controlling unit implements plural frame transmission procedures to transmit the plural read data to the host. The flash memory is connected with the controlling unit. The cache memory is connected with the controlling unit. After a first frame transmission procedure is completed by the controlling unit and before a second frame transmission procedure is started by the controlling unit, the controlling unit waits for a specified time period. If a frame transmission request corresponding to a third frame transmission procedure is not issued from the host to the controlling unit in the specified time period, the second frame transmission procedure is implemented by the controlling unit after the specified time period.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention provides a storage device using a SATA bus to connect with a host. The present invention also provides a data transmission control method for the storage device. Hereinafter, the storage device is illustrated by referring to a solid state drive. It is noted that the storage device is not restricted to the solid state drive. For example, in some other embodiments, the storage device is a hard disc drive.

Figure 1:
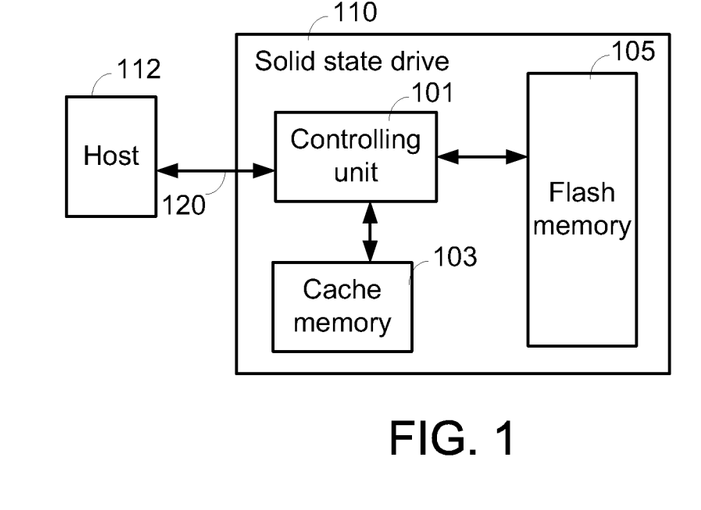
FIG. 1 is a schematic functional block diagram illustrating the connection between a solid state drive and a host according to an embodiment of the present invention.

FIG. 1 is a schematic functional block diagram illustrating the connection between a solid state drive and a host according to an embodiment of the present invention. In this embodiment, both of the host 112 and the solid state drive 110 comply with the SATA 3.0 specification. Moreover, the solid state drive 110 is a storage device that supports native command queuing (NCQ), and the host 112 also supports native command queuing (NCQ).

As shown in FIG. 1, the host 112 is in communication with a controlling unit 101 of the solid state drive 110 through a SATA bus 120. Consequently, commands, write data or read data can be exchanged between the host 112 and the solid state drive 110.

Moreover, the solid state drive 110 further comprises a cache memory 103 and a flash memory 105. The controlling unit 101 is connected with the flash memory 105 and the cache memory 103.

The cache memory 103 is connected with the controlling unit 101 for temporarily storing the write data from the host 112 or temporarily storing the read data requested by the host 112.

For example, in case that the host 112 issues the write command, the corresponding write data is temporarily stored into the cache memory 103 by the controlling unit 101, and then the write data is transferred from the cache memory 103 to the flash memory 105. Whereas, in case that the host 112 issues the read command, the read data is retrieved from the flash memory 105 and temporarily stored into the cache memory 103 by the controlling unit 101, and then the read data is transmitted from the cache memory 103 to the host 112.

Figure 2:
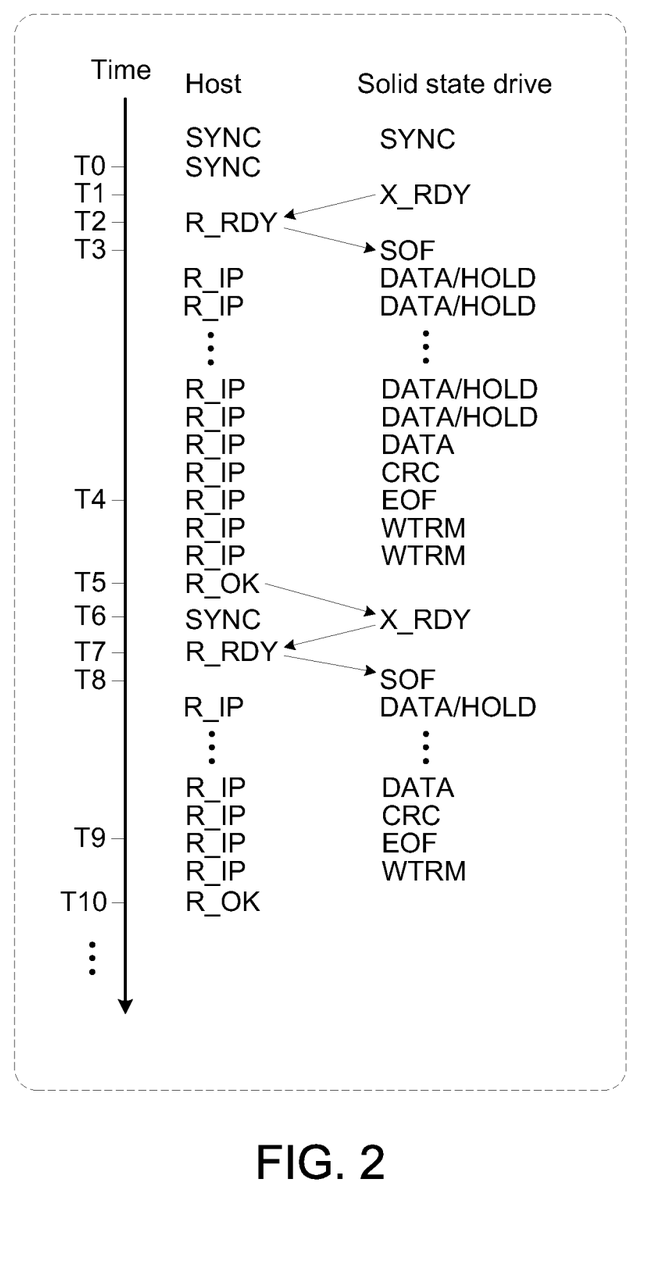
FIG. 2 is a schematic sequence diagram illustrating the transmission of the primitives of the link layers between the host and the solid state drive according to the SATA specification.

FIG. 2 is a schematic sequence diagram illustrating the transmission of the primitives of the link layers between the host and the solid state drive according to the SATA specification. As shown in FIG. 2, plural frames are transmitted from the solid state drive 110 to the host 112. The primitives are also referred as original commands.

Before the time point T0, no frame transmission between the host 112 and the solid state drive 110 is implemented. Consequently, the host 112 and the solid state drive 110 issue SYNC primitives to each other to notify the other side that no frame transmission is being implemented. Moreover, if the SYNC primitive cannot be received by the host 112 and the solid state drive 110, it is assured that the host 112 and the solid state drive 110 is no longer in communication with each other through the SATA bus 120.

At the time point T1, the solid state drive 110 intends to transmit a data (e.g. a read data) to the host 112. Consequently, the solid state drive 110 issues a X_RDY primitive to notify the host 112 that the frame transmission is ready.

At the time point T2, the host 112 issues a R_RDY primitive to respond to the solid state drive 110 that the host 112 is ready to receive the frame.

According to the R_RDY primitive from the host 112, the solid state drive 110 issues a SOF primitive at the time point T3 to notify the host 112 that the frame transmission is started.

The interval from the time point T3 to the time point T5 indicates a complete frame transmission procedure of the solid state drive 110. After the solid state drive 110 issues the SOF primitive, the solid state drive 110 transmits a data (DATA) or issues a HOLD primitive to stop the frame transmission according to the practical conditions. The host 112 continuously issues a R_IP primitive to notify the solid state drive 110 that the host 112 is receiving and processing the data from the solid state drive 110. After the data from the solid state drive 110 is completely outputted and a cyclic redundancy check (CRC) value is issued, the solid state drive 110 issues an EOF primitive at the time point T4 to notify the host 112 that the frame transmission is ended.

After the frame transmission of the solid state drive 110 is ended, the solid state drive 110 waits for the frame reception of the host 112 in the interval from the time point T4 to the time point T5. While the host 112 is processing the frame, the host 112 continuously issues the R_IP primitive. While the solid state drive 110 waits for the host 112 to process the frame, the solid state drive 110 issues a WTRM primitive to wait for the frame termination of the host 112. At the time point T5, the host 112 issues a R_OK primitive to notify the solid state drive 110 that the frame reception has no error. That is, at the time point T5, both of the host 112 and the solid state drive 110 confirm that the frame transmission procedure is successfully completed.

At the time point T6, the solid state drive 110 issues the X_RDY primitive again to notify the host 112 that the next frame transmission is ready. Meanwhile, the host 112 issues the SYNC primitive to notify the solid state drive 110 that no frame transmission is being implemented. Consequently, at the time point T7, the host 112 issues a R_RDY primitive to respond to the solid state drive 110 that the host 112 is ready to receive the next frame. The interval from the time point T8 to the time point T10 indicates another complete frame transmission procedure of the solid state drive 110. The frame transmission procedure from the time point T8 to the time point T10 is similar to the frame transmission procedure from the time point T3 to the time point T5, and is not redundantly described herein.

Figure 3:
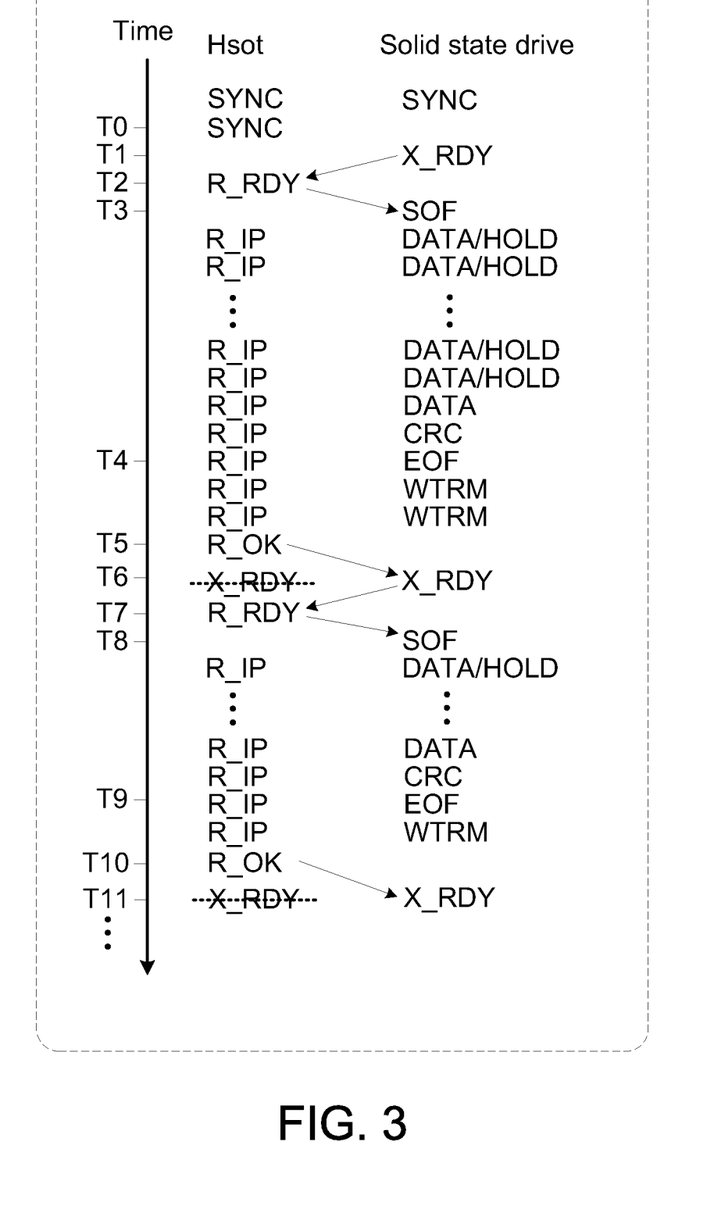
FIG. 3 is another schematic sequence diagram illustrating the transmission of the primitives of the link layers between the host and the solid state drive according to the SATA specification.

FIG. 3 is another schematic sequence diagram illustrating the transmission of the primitives of the link layers between the host and the solid state drive according to the SATA specification. As shown in FIG. 3, plural frames are transmitted from the solid state drive 110 to the host 112, and plural data are intended to be transmitted from the host 112 to the solid state drive 110.

Before the time point T0, no frame transmission between the host 112 and the solid state drive 110 is implemented. Consequently, the host 112 and the solid state drive 110 issue SYNC primitives to each other.

In the interval from the time point T1 to the time point T3, the solid state drive 110 intends to transmit a data (e.g. a read data) to the host 112. That is, at the time point T1, the solid state drive 110 issues a X_RDY primitive to notify the host 112. At the time point T2, the host 112 issues a R_RDY primitive to respond to the solid state drive 110. At the time point T3, the solid state drive 110 issues a SOF primitive to notify the host 112 that the frame transmission is started.

The interval from the time point T3 to the time point T5 indicates a complete frame transmission procedure of the solid state drive 110. The frame transmission procedure from the time point T3 to the time point T5 is not redundantly described herein. At the time point T5, both of the host 112 and the solid state drive 110 confirm that the frame transmission procedure is successfully completed.

At the time point T6, the host 112 issues the X_RDY primitive to notify the solid state drive 110 that the frame transmission is ready. At the same time, the solid state drive 110 also issues the X_RDY primitive again to notify the host 112 that the frame transmission is ready.

As previously described, the host 112 has to postpone the frame transmission according to the SATA 3.0 specification. Consequently, the frame transmission of the host 112 will be postponed, which is indicated as the dotted line. However, the frame transmission of the solid state drive 110 is continuously performed. Consequently, at the time point T7, the host 112 issues a R_RDY primitive to respond to the solid state drive 110 that the host 112 is ready to receive the next frame.

The interval from the time point T8 to the time point T10 indicates another complete frame transmission procedure of the solid state drive 110. That is, at the time point T10, the host 112 and the solid state drive 110 confirms again that the frame transmission procedure is successfully completed.

At the time point T11, the host 112 issues the X_RDY primitive to notify the solid state drive 110 that the frame transmission is ready. At the same time, the solid state drive 110 also issues the X_RDY primitive again to notify the host 112 that the frame transmission is ready. Similarly, the frame transmission of the host 112 is postponed. Under this circumstance, the host 112 is only able to receive the frame from the solid state drive 110.

From the above discussions of FIG. 3, if the read data is continuously transmitted back from the solid state drive 110 to the host 112, the frame transmission of the host 112 is postponed. In other words, after all of the read data are completely transmitted from the solid state drive 110 to the host 112 and no read commands are ready to be executed by solid state drive 110, the frame transmission request can be successfully issued by the host 112 and the new read command can be successfully transmitted to the solid state drive 110. In other words, the accessing performance of the solid state drive 110 is still unsatisfied.

Figure 4:
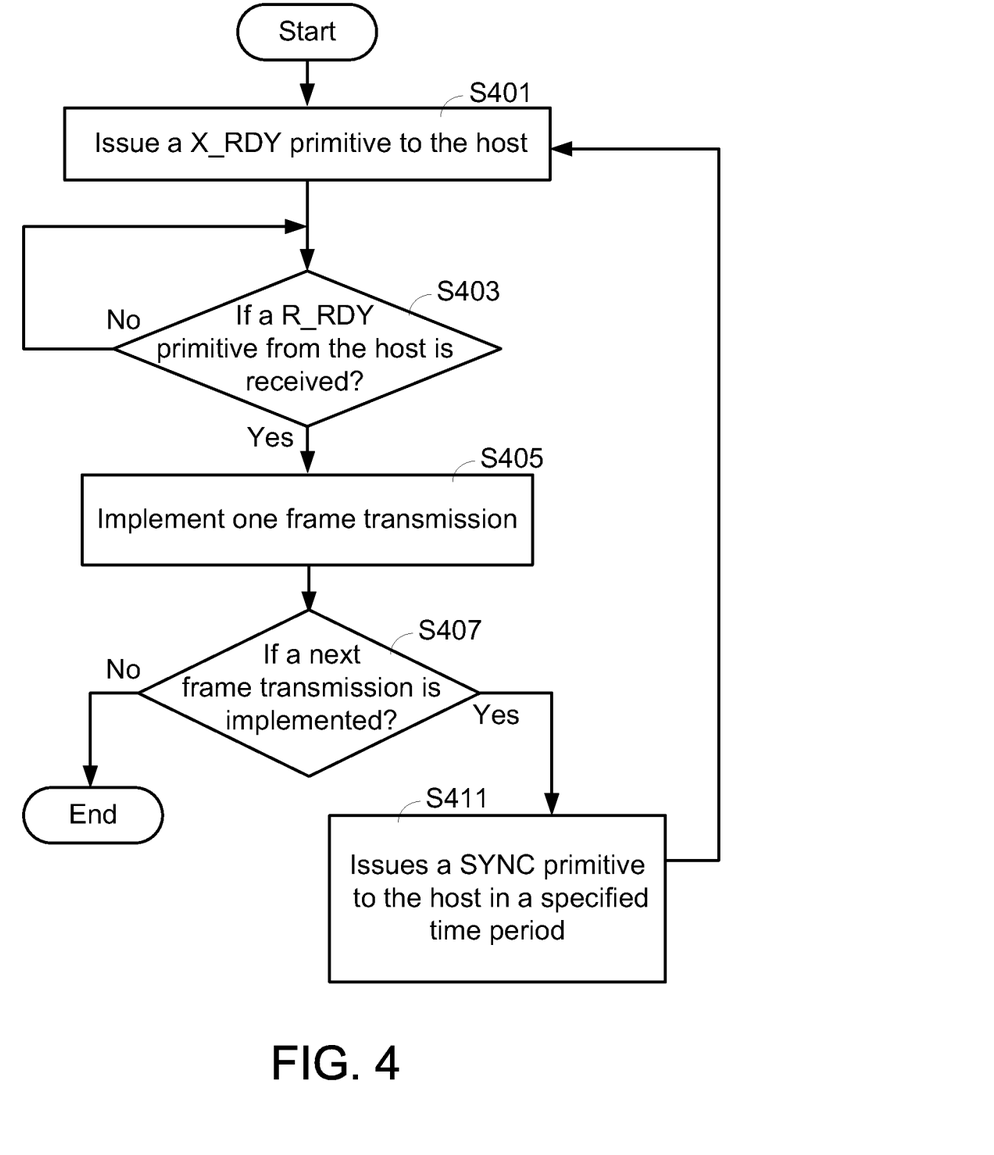
FIG. 4 is a flowchart illustrating a data transmission control method for a solid state drive according to an embodiment of the present invention.

FIG. 4 is a flowchart illustrating a data transmission control method for a solid state drive according to an embodiment of the present invention. The data transmission control method is implemented by the controlling unit 101.

After the solid state drive 110 is enabled and plural read data are intended to be transmitted back to the host 112, the solid state drive 110 issues a X_RDY primitive to the host 112 (Step S401). If a R_RDY primitive from the host 112 is not received by the solid state drive 110 (Step S403), the solid state drive 110 continuously waits for the R_RDY primitive from the host 112. Of course, the solid state drive 110 may issue the X_RDY primitive to the host 112 again.

If the R_RDY primitive from the host 112 is received by the solid state drive 110 (Step S403), the solid state drive 110 transmits a frame to the host 112 (Step S405).

After the frame transmission is completed, the solid state drive 110 judges whether a next frame transmission is implemented (Step S407). If the next frame transmission is not implemented by the solid state drive 110, the flowchart is ended.

Whereas, if the solid state drive 110 intends to implement the next frame transmission, the solid state drive 110 issues a SYNC primitive to the host 112 in a specified time period (Step S411). Then, the step S401 of issuing the X_RDY primitive to the host 112 is repeatedly executed.

In this embodiment, after one frame transmission is completed by the solid state drive 110 and in the specified time period before the next frame transmission is implemented, the solid state drive 110 may issue plural SYNC primitives to the host 112.

Since the solid state drive 110 issues the plural SYNC primitives in the specified time period, if the host 112 intends to implement one frame transmission, the host 112 may issue the X_RDY primitive to the solid state drive 110 in the specified time period. After the solid state drive 110 issues the R_RDY primitive to respond to the host 112, the frame from the host 112 may be received by the solid state drive 110. Under this circumstance, the next frame transmission of the solid state drive 110 is not implemented.

On the other hand, if the host 112 does not intend to implement the frame transmission, the host 112 also issues the plural SYNC primitives to the solid state drive 110 in the specified time period. After the specified time period, the solid state drive 110 may issue the X_RDY primitive to the host 112 again, and the next frame transmission may be started.

Figure 5A:
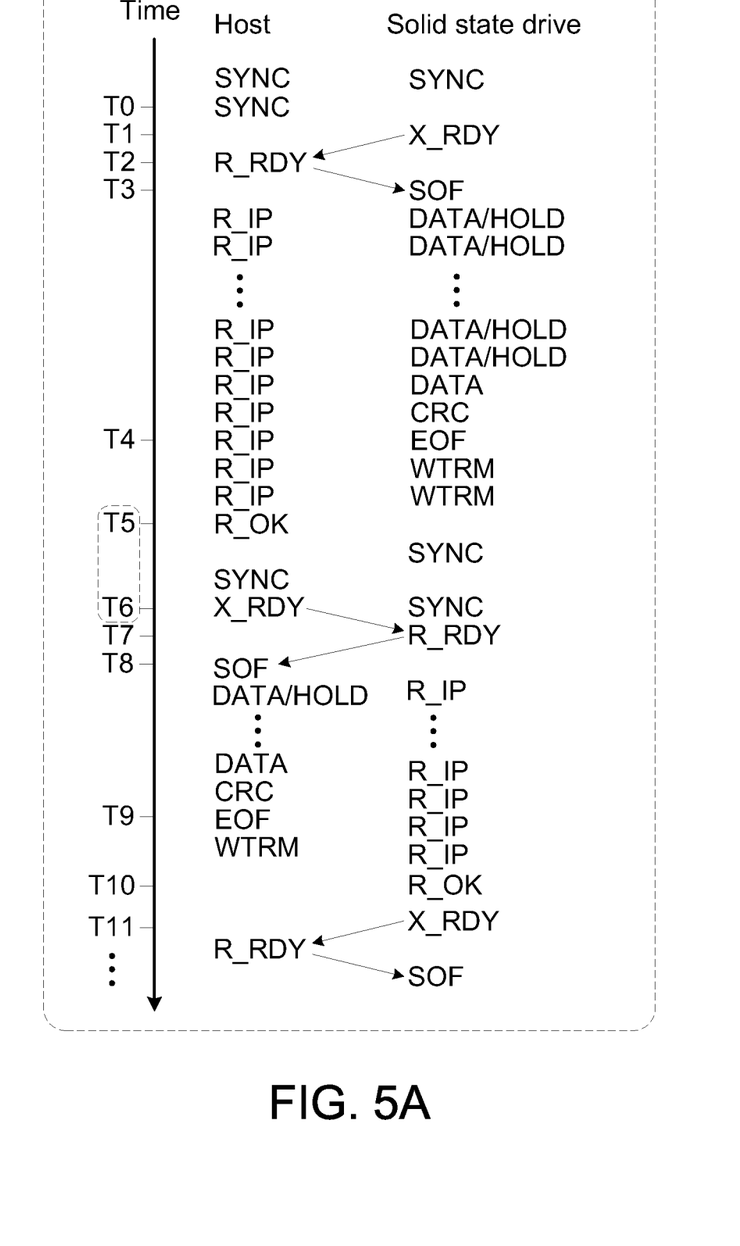
FIG. 5A is a schematic sequence diagram illustrating the transmission of the primitives of the link layers between the host and the solid state drive according to an embodiment of the present invention.

FIG. 5A is a schematic sequence diagram illustrating the transmission of the primitives of the link layers between the host and the solid state drive according to an embodiment of the present invention. As shown in FIG. 5A, plural frames are transmitted from the solid state drive 110 to the host 112, and plural data are transmitted from the host 112 to the solid state drive 110.

Before the time point T0, no frame transmission between the host 112 and the solid state drive 110 is implemented. Consequently, the host 112 and the solid state drive 110 issue SYNC primitives to each other.

In the interval from the time point T1 to the time point T3, the solid state drive 110 intends to transmit a data (e.g. a read data) to the host 112. That is, at the time point T1, the solid state drive 110 issues a X_RDY primitive to notify the host 112. At the time point T2, the host 112 issues a R_RDY primitive to respond to the solid state drive 110. At the time point T3, the solid state drive 110 issues a SOF primitive to notify the host 112 that the frame transmission is started.

The interval from the time point T3 to the time point T5 indicates a complete frame transmission procedure of the solid state drive 110. The frame transmission procedure from the time point T3 to the time point T5 is not redundantly described herein. At the time point T5, both of the host 112 and the solid state drive 110 confirm that the frame transmission procedure is successfully completed.

In this embodiment, the interval from the time point T5 to the time point T6 indicates the specified time period. That is, in the interval from the time point T5 to the time point T6, the solid state drive 110 issues the SYNC primitive to the host 112. At the time point T6, the host 112 issues the X_RDY primitive to the solid state drive 110 to notify the solid state drive 110 that the frame transmission is ready.

At the time point T7, the solid state drive 110 issues the R_RDY primitive to respond to the host 112. Consequently, the interval from the time point T8 to the time point T10 indicates a complete frame transmission procedure of the host 112. At the time point T10, both of the host 112 and the solid state drive 110 confirm that the frame transmission procedure is successfully completed.

Obviously, in the specified time period from the time point T5 to the time point T6, the solid state drive 110 issues the SYNC primitive to the host 112. Consequently, the host 112 may issue the X_RDY primitive in the specified time period, the frame transmission of the host 112 may be successfully implemented in the interval from the time point T8 to the time point T10. That is, in the interval from the time point T8 to the time point T10, the solid state drive 110 is only able to receive the frame from the host 112, but the frame transmission of the solid state drive 110 cannot be implemented.

After the time point T10, the solid state drive 110 intends to implement the next frame transmission. At the time point T11, the solid state drive 110 issues the X_RDY primitive to the host 112. Consequently, the frame transmission of the solid state drive 110 is implemented again.

Figure 5B:
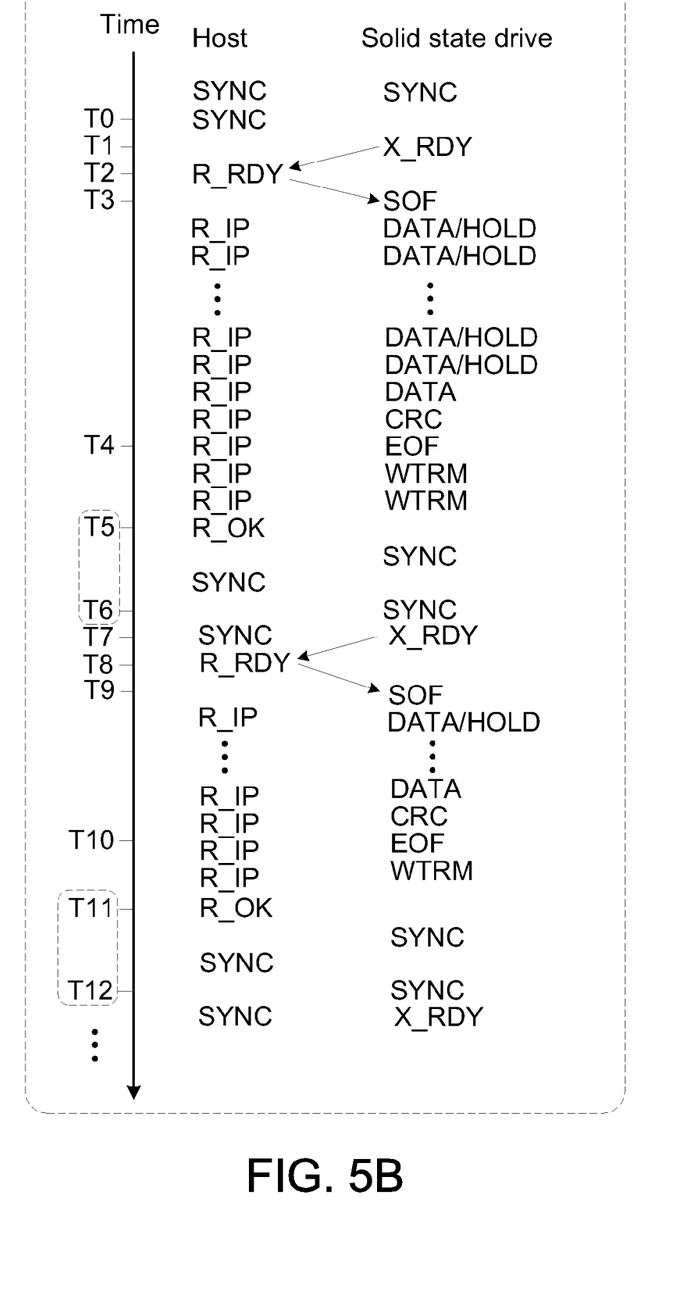
FIG. 5B is a schematic sequence diagram illustrating the transmission of the primitives of the link layers between the host and the solid state drive according to another embodiment of the present invention.

FIG. 5B is a schematic sequence diagram illustrating the transmission of the primitives of the link layers between the host and the solid state drive according to another embodiment of the present invention. As shown in FIG. 5B, plural frames are transmitted from the solid state drive 110 to the host 112, but no data are transmitted from the host 112 to the solid state drive 110.

Before the time point T0, no frame transmission between the host 112 and the solid state drive 110 is implemented. Consequently, the host 112 and the solid state drive 110 issue SYNC primitives to each other.

In the interval from the time point T1 to the time point T3, the solid state drive 110 intends to transmit a data (e.g. a read data) to the host 112. That is, at the time point T1, the solid state drive 110 issues a X_RDY primitive to notify the host 112. At the time point T2, the host 112 issues a R_RDY primitive to respond to the solid state drive 110. At the time point T3, the solid state drive 110 issues a SOF primitive to notify the host 112 that the frame transmission is started.

The interval from the time point T3 to the time point T5 indicates a complete frame transmission procedure of the solid state drive 110. The frame transmission procedure from the time point T3 to the time point T5 is not redundantly described herein. At the time point T5, both of the host 112 and the solid state drive 110 confirm that the frame transmission procedure is successfully completed.

In this embodiment, the interval from the time point T5 to the time point T6 indicates the specified time period. That is, in the interval from the time point T5 to the time point T6, the solid state drive 110 issues the SYNC primitive to the host 112. Since the host 112 does not intend to transmit the data to the solid state drive 110, the host 112 also issues the SYNC primitive to the solid state drive 110 in the interval from the time point T5 to the time point T6.

Since the solid state drive 110 still intends to transmit a data to the host 112, the solid state drive 110 issues the X_RDY primitive to the host 112 at the time point T7. At the time point T8, the host 112 issues the R_RDY primitive to respond to the solid state drive 110.

The interval from the time point T9 to the time point T11 indicates another complete frame transmission procedure of the solid state drive 110. The frame transmission procedure from the time point T9 to the time point T11 is not redundantly described herein. At the time point T11, both of the host 112 and the solid state drive 110 confirm that the frame transmission procedure is successfully completed.

The interval from the time point T11 to the time point T12 indicates another specified time period. In the interval from the time point T11 to the time point T12, the solid state drive 110 waits for the frame transmission of the host 112. After the time point T12, the solid state drive 110 confirms that no frame transmission of the host 112 is implemented. Consequently, the solid state drive 110 issues the X_RDY primitive to implement the next frame transmission.

From the above descriptions, the present invention provides a data transmission control method for a solid state drive. After one frame transmission is completed by the solid state drive 110 and in a specified time period before the next frame transmission is implemented, the solid state drive 110 issues plural SYNC primitives to the host 112. Under this circumstance, since the host 112 has sufficient time to issue the X_RDY primitive, the host 112 has the opportunity to implement the frame transmission. Consequently, the accessing performance of the solid state drive 110 is largely enhanced.

In the above embodiments, the specified time period may be determined according to the computing speed of the host 112. Generally, the specified time period is about 100 ns-1000 ns. The specified time period may be a fixed time period. Alternatively, the specified time period is dynamically adjusted to be increased or decreased according to the difference between the host 112 and the solid state drive 110 in order to achieve the optimal performance. The difference may be the transmitting speed difference or the computing speed difference between the host 112 and the solid state drive 110. Moreover, the specified time period is adjustable according to the settings of the controlling unit 101.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data transmission control method for a storage device, the storage device being in communication with a host through a SATA bus, the data transmission control method comprising steps of:

issuing a X_RDY primitive from the storage device to the host;

transmitting a first frame to the host after a R_RDY primitive from the host is received by the storage device;

issuing plural SYNC primitives from the storage device to the host after the first frame is completely transmitted and in a specified time period before a second frame is transmitted; and if the host does not issue the X_RDY primitive in the specified time period, transmitting the second frame to the host.

2. The data transmission control method as claimed in claim 1, wherein if the host issues the X_RDY primitive in the specified time period, the data transmission control method further comprises a step of transmitting a third frame from the host to the storage device while stopping transmitting the second frame to the host.

3. The data transmission control method as claimed in claim 1, wherein the specified time period is a fixed time period.

4. The data transmission control method as claimed in claim 1, wherein the specified time period is dynamically adjusted to be increased or decreased according to a transmitting speed difference between the host and the storage device or a computing speed difference between the host and the storage device.

5. A storage device in communication with a host through a SATA bus, the storage device comprising:

a controlling unit for receiving plural read commands from the host and correspondingly transmitting plural read data to the host, wherein the controlling unit implements plural frame transmission procedures to transmit the plural read data to the host;

a flash memory connected with the controlling unit; and a cache memory connected with the controlling unit, wherein after a first frame transmission procedure is completed by the controlling unit and before a second frame transmission procedure is started by the controlling unit, the controlling unit waits for a specified time period, wherein if a frame transmission request corresponding to a third frame transmission procedure is not issued from the host to the controlling unit in the specified time period, the second frame transmission procedure is implemented by the controlling unit after the specified time period, wherein if the frame transmission request corresponding to the third frame transmission procedure is issued from the host to the controlling unit in the specified time period, the third frame transmission procedure of the host is processed by the controlling unit but the second frame transmission procedure is stopped.

6. The storage device as claimed in claim 5, wherein in the specified time period, the controlling unit issues plural SYNC primitives to the host.

7. The storage device as claimed in claim 5, wherein the specified time period is a fixed time period.

8. A storage device in communication with a host through a SATA bus, the storage device comprising:

a controlling unit for receiving plural read commands from the host and correspondingly transmitting plural read data to the host, wherein the controlling unit implements plural frame transmission procedures to transmit the plural read data to the host;

a flash memory connected with the controlling unit; and a cache memory connected with the controlling unit, wherein after a first frame transmission procedure is completed by the controlling unit and before a second frame transmission procedure is started by the controlling unit, the controlling unit waits for a specified time period, wherein if a frame transmission request corresponding to a third frame transmission procedure is not issued from the host to the controlling unit in the specified time period, the second frame transmission procedure is implemented by the controlling unit after the specified time period, wherein the specified time period is dynamically adjusted to be increased or decreased according to a transmitting speed difference between the host and the storage device or a computing speed difference between the host and the storage device.

* * * * *